No. 648,500. Patented May 1, 1900.
J. KOENIG.
COMB POINTING MACHINE.
(Application filed Nov. 20, 1899.)
(No Model.) 3 Sheets—Sheet 1.
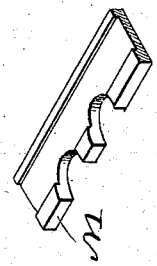
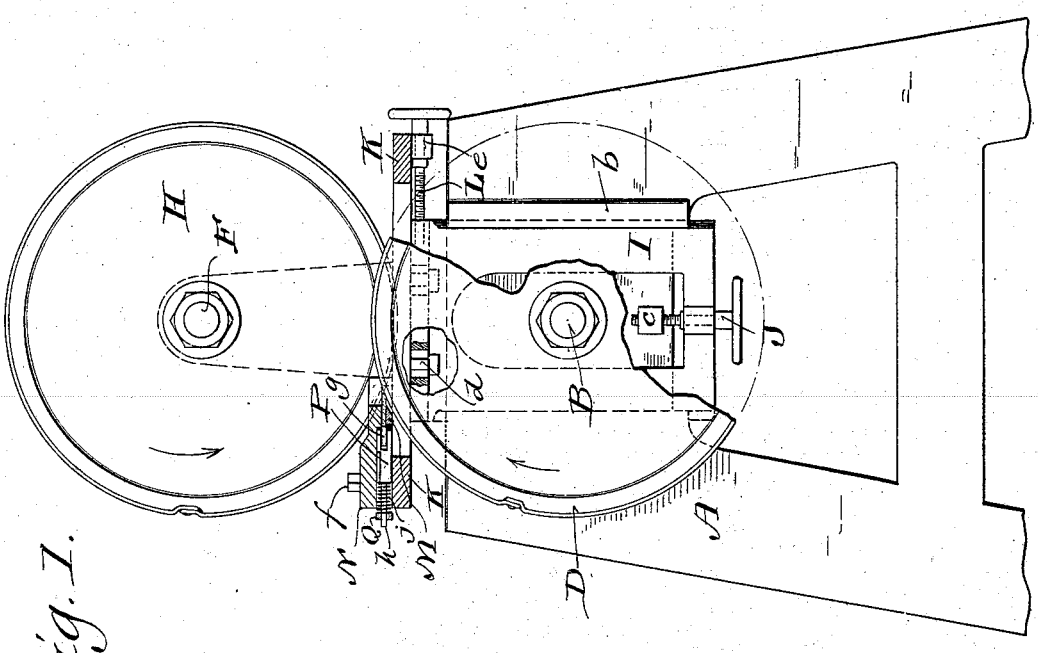
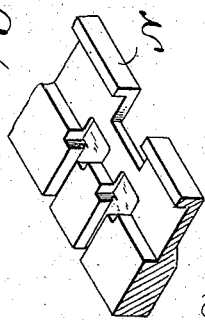
Witnesses:
Geo W Young
N E Oliphant
Inventor
Joseph Koenig
By H. G. Underwood
Attorney

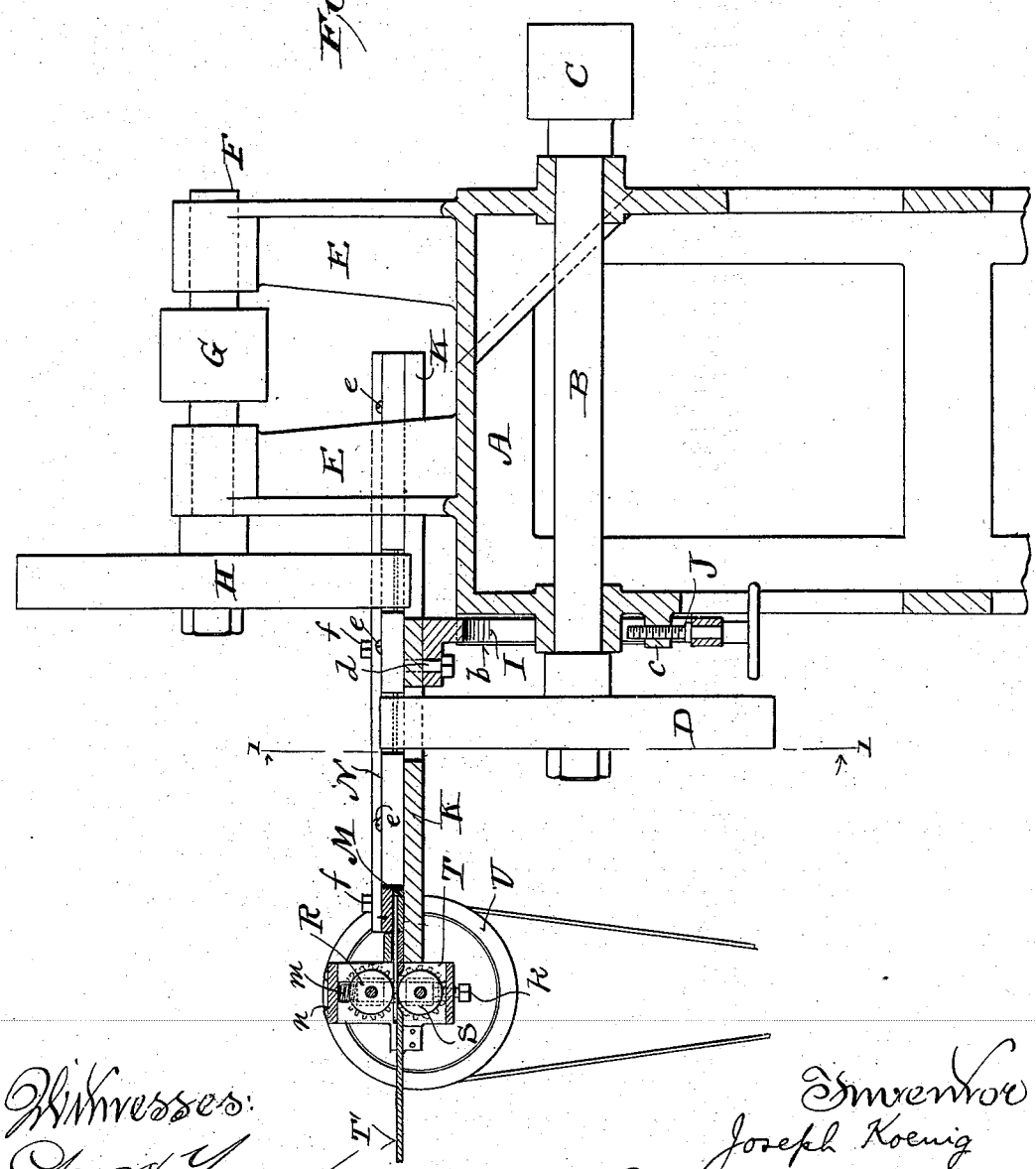

No. 648,500. Patented May 1, 1900.
J. KOENIG.
COMB POINTING MACHINE.
(Application filed Nov. 20, 1899.)
(No Model.) 3 Sheets—Sheet 3.
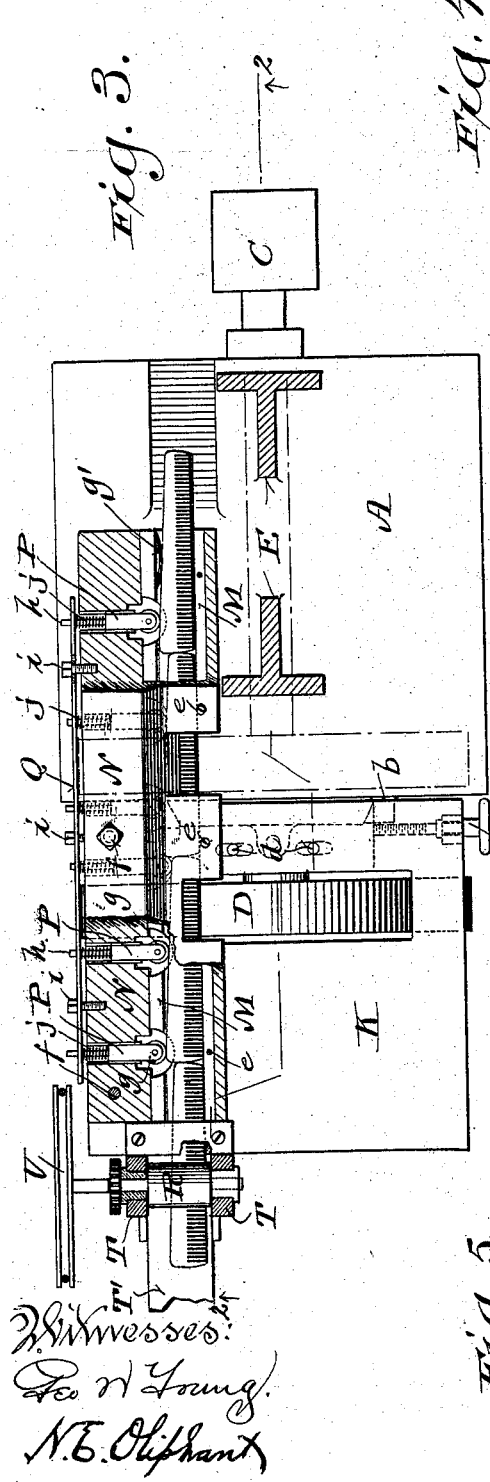
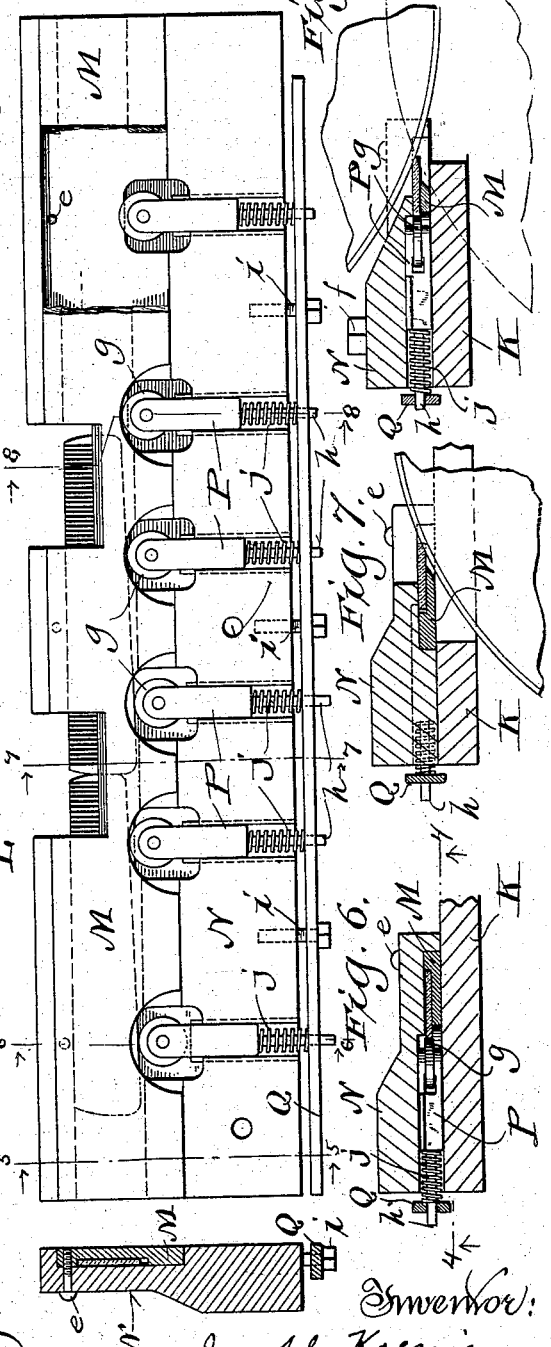

UNITED STATES PATENT OFFICE.

JOSEPH KOENIG, OF TWO RIVERS, WISCONSIN, ASSIGNOR TO THE ALUMINUM MANUFACTURING COMPANY, OF SAME PLACE.

COMB-POINTING MACHINE.

SPECIFICATION forming part of Letters Patent No. 648,500, dated May 1, 1900.

Application filed November 20, 1899. Serial No. 737,572. (No model.)

*To all whom it may concern:*

Be it known that I, JOSEPH KOENIG, a citizen of the United States, and a resident of Two Rivers, in the county of Manitowoc and State of Wisconsin, have invented certain new and useful Improvements in Comb-Pointing Machines; and I do hereby declare that the following is a full, clear, and exact description thereof.

My invention has for its object to provide simple economical machines especially designed for pointing the teeth of metal combs; and it consists in certain peculiarities of construction and combination of parts, hereinafter particularly set forth with reference to the accompanying drawings and subsequently claimed.

Figure 1 of the drawings represents a partly-sectional end elevation of a comb-pointing machine in accordance with my invention, the plane of the view being indicated by line 1 1 in Fig. 2; Fig. 2, an irregular longitudinal section of the same, this view being indicated by lines 2 2 in Fig. 3; Fig. 3, a plan view of the machine, partly in horizontal section; Fig. 4, a plan view of the comb-guide as it appears inverted and partly broken, the plane of the view being indicated by line 4 4 in Fig. 6; Figs. 5, 6, 7, and 8, detail transverse sections, respectively indicated by lines 5 5, 6 6, 7 7, and 8 8 in Fig. 4; and Figs. 9 and 10, perspective views of detail portions of said comb-guide inverted.

Referring by letter to the drawings, A represents a stand having sides thereof provided with bearings for a shaft B, to which a driving-pulley C and abrading-wheel D are made fast. Surmounting the stand are standards E, that constitute bearings for another shaft F, having a driving-pulley G and abrading-wheel H in connection therewith. The abrading-wheels are preferably of that class having metal bodies faced with emery paper or cloth, and in the machine herein set forth these wheels are arranged one in advance of the other; but their shafts are parallel.

One side of the stud is provided with central vertical guides $b$, the upper ends of which come flush with the top of said stand, and a vertical plate I, engaging the guides, is provided with a longitudinal slot in order to clear an adjacent bearing for the shaft B aforesaid. A tapped lug $c$ of the stand is engaged by an adjusting-screw J, that turns loosely in the lower end of the plate I, central of the same. The upper end of the plate I is provided with a right-angled flange, and set-screws $d$, extending through slots longitudinally of the flange, engage an angular table K, provided with a depending bearing-lug $e'$ for another adjusting-screw L, that engages a tapped opening provided in said plate. From the foregoing it will be understood that the table may be adjusted in a vertical and horizontal direction, the set-screws $d$ being loosened to permit the horizontal adjustment. The broad portion of the table is slotted to obtain clearance for abrading-wheel D, and the abrading-wheel H is clear of the narrow portion of said table.

The table supports a comb-guide that consists of two longitudinally-channeled plates M N, fitted one within the other and held together by screws $e$, arranged at suitable intervals. The width of channel in plate M is proportionate to the greatest width of combs to be operated upon by the machine, and in practice said machine will be provided with interchangeable plates M, all having the same general width, although variable in the matter of channel-width. Transverse notches at intervals longitudinally of one edge of the comb-guide plates intercept the channels therein, and by means of set-screws $f$ the plate N is made fast to table L aforesaid. Blocks P have tongue-and-groove connection with comb-guide plate N in the transverse notches thereof, and revoluble antifriction-disks $g$ are carried by the blocks to have impingement against the back edges of combs fed to the machine. Stems $h$, extending from the blocks P, engage openings in a tension-bar Q, adjustably connected to comb-guide plate N by means of screws $i$, and spiral springs $j$ are arranged on the stems between said blocks and tension-bar. The yielding tension devices embodying the antifriction-disks may be supplemented by spring-plates arranged to bear on the backs of the combs, or such plates may constitute substitutes for the other yielding tension devices, and I have shown one of these plates at g' in Fig. 3. The plates M N of the comb-guide are also notched in the edges thereof opposite the edges aforesaid to obtain clearance for the abrading-wheels D H, and combs fed along in said guide have their teeth pointed by contact with said wheels, the latter operating successively upon opposite sides of the comb-teeth.

The antifriction-disks carried by the spring-controlled blocks P exert yielding pressure on the combs fed along the guide, and thus the comb-teeth are kept snugly against a straight edge in said guide irrespective of variations in width of said combs, the disposition of said blocks being such that at least two of said antifriction-disks are in contact with a comb during travel of same across the face of an abrading-wheel.

The combs are fed to the guide between upper and lower rollers R S, journaled in boxes loose in guides constituting parts of a bracket T, made fast on table K aforesaid. The boxes for the lower-roller journals rest on adjusting-screws $k$, and the boxes for the upper-roller journals are opposed by spiral springs $m$ under tension against a head-plate $n$ of the aforesaid bracket. One journal of the lower feed-roller is provided with a pulley U for a driving-belt, and the horizontal comb-slide portion T' of the bracket is extended to connect with another machine, from which it receives the combs, the latter having automatic feed from one to the other of the machines.

In practice the table K is adjusted to accurately center the traveling combs with respect to the faces of the abrading-wheels, and said combs being fed one by one between the rollers R S they are automatically pushed along in the above-described guide to be operated upon by said abrading-wheels in the arrangement specified, whereby the pointing of the teeth is successfully accomplished during one passage of each comb through the machine.

While I have shown and described a practical machine in accordance with my invention, its details may be indefinitely varied without departure from the scope of said invention—as, for instance, the machine may be organized to have the combs fed thereto in upright position, in which instance the abrading-wheels will be set on the same horizontal plane instead of one above the other, their vertical adjustment becoming lateral.

Having thus described my invention, what I claim as new, and desire to secure by Letters Patent, is—

1. A comb-pointing machine comprising a guide having edge notches abrading-wheels arranged one in advance of the other to operate in said notches on opposite sides of the teeth of combs propelled in the guide, and a stand of feed-rollers adjacent to one end of said guide.

2. A comb-pointing machine comprising a guide having edge notches, abrading-wheels arranged one in advance of the other to operate in said notches on opposite sides of the teeth of combs propelled in the guide, and yielding pressure devices arranged to impinge the backs of said combs.

3. A comb-pointing machine comprising a comb-guide consisting of two longitudinally-channeled plates fitting one within the other and provided with opposite edge notches intercepting their channels, yielding antifriction pressure devices arranged in one series of the notches to impinge the backs of combs propelled in the guide, and abrading-wheels arranged one in advance of the other to operate in the others of said notches on opposite sides of the teeth of the combs.

4. A comb-pointing machine comprising a comb-guide consisting of two longitudinally-channeled plates fitting one within the other and provided with opposite edge notches intercepting their channels, yielding antifriction pressure devices arranged in one series of the notches to impinge the backs of combs propelled in the guide, means for regulating tension of the pressure devices, and abrading-wheels arranged one in advance of the other to operate in the others of said notches on opposite sides of the teeth of the combs.

5. A comb-pointing machine comprising an adjustable table, a guide, and abrading-wheels arranged one in advance of the other to operate on opposite sides of teeth of combs propelled in said guide.

6. A comb-pointing machine comprising a vertically and horizontally adjustable table, a notched edge guide, supported on the table, and abrading-wheels arranged one in advance of the other to operate in edge notches of the guide on opposite sides of teeth of combs propelled in said guide.

7. A comb-pointing machine, comprising a stand having sides thereof provided with bearings, a shaft mounted in the bearings, standards rising from the stand, another shaft having its bearings in the standards parallel with the shaft aforesaid, a table having vertically and horizontally adjustable connection with said stand, a guide supported on the table, and abrading-wheels arranged on said shafts one in advance of the other to operate in edge notches of the guide on opposite sides of teeth of combs propelled in said guide.

8. A comb-pointing machine comprising a stand having sides thereof provided with bearings, a shaft mounted in the bearings, standards rising from the stand, another shaft having its bearings in the standards parallel with the shaft aforesaid, a table in vertically and horizontally adjustable connection with said stand, a guide supported on the table, yielding antifriction pressure devices arranged to impinge backs of combs propelled in the guide, and abrading-wheels arranged on said shafts one in advance of the other to operate in edge notches of said guide on opposite sides of the teeth of said combs.

In testimony that I claim the foregoing I have hereunto set my hand, at Two Rivers, in the county of Manitowoc and State of Wisconsin, in the presence of two witnesses.

JOSEPH KOENIG.

Witnesses:
J. F. MAGEE,
W. J. WRIETH.